May 20, 1952 F. ERHARDT 2,597,308
ALIGNER FOR SHAFT HOUSINGS
Filed July 13, 1948
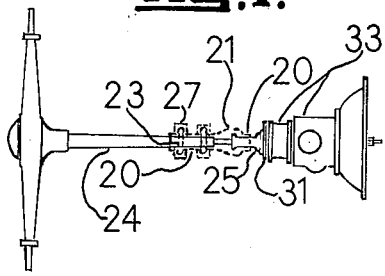
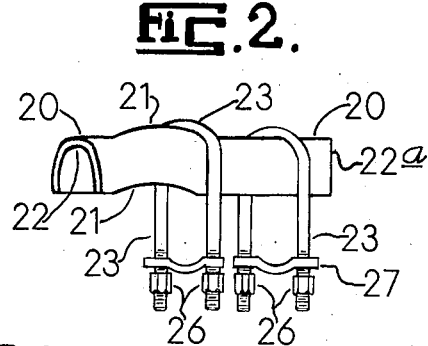
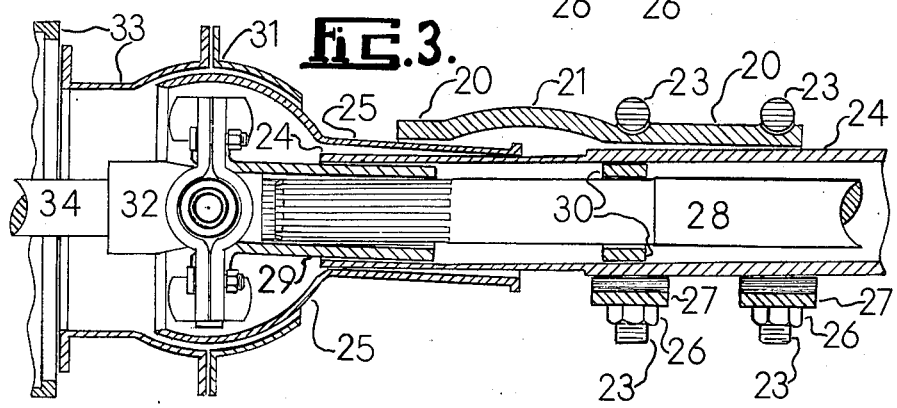
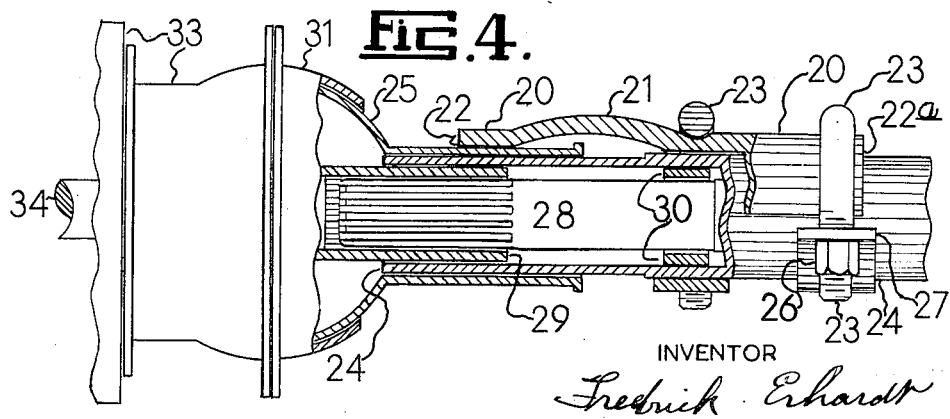
INVENTOR
Fredrick Erhardt Patented May 20, 1952

2,597,308

UNITED STATES PATENT OFFICE 2,597,308

ALIGNER FOR SHAFT HOUSINGS

Fredrick Erhardt, Regina, Saskatchewan, Canada

Application July 13, 1948, Serial No. 38,540

2 Claims. (Cl. 64—3)

This invention relates to an automobile propeller shaft housing and universal ball housing aligner or support which may be easily and quickly attached in assembly with an automobile propeller shaft housing assembly when needed, and is particularly designed to bring back and retain a propeller shaft housing and universal ball housing into proper alignment, when they have become out of alignment through wear.

While conventional or known types of propeller shaft housing supports are helpful to steady the propeller shaft housing and universal ball housing assembly, when they have become loose through wear, they are not positive in retaining the assemblies in true axial alignment.

An important object of my invention is to provide a propeller shaft housing support relatively simple in construction, and easy to attach, that will accurately and effectively hold an automobile propeller shaft housing and universal ball housing in true alignment regardless of vibration and wear.

A further object of my invention is to provide supporting means to an automobile universal ball housing and propeller shaft housing assembly which will not interfere with the necessary reciprocating movements of the housing assembly.

A further object of the invention is to provide supporting and retaining means for worn propeller shaft housings, as illustrated in Figure 3 of the annexed drawings, which may be inexpensively manufactured.

A still further object of my invention is to provide means to realign a propeller shaft housing and a universal ball housing and retain them in alignment while in motion in order to prevent undue wear of the universal joints and propeller shaft bearings.

Other objects and advantages inherent in my invention will be apparent from the following description of an embodiment thereof and the appended drawings wherein:

Figure 1 is a top plan view of an automobile rear housing to transmission assembly;

Figure 2 is a horizontal elevation of my automobile housing support;

Figure 3 is a longitudinal central section of an automobile propeller shaft housing 24, a universal ball housing 25, a universal ball housing retaining ring 31, a universal spline yoke 29 which is part of the universal joint 32, the clamp bars 27, a propeller shaft steady bearing 30, transmission parts 33, and my propeller shaft housing support 20 in assembly. Other parts not centrally sectioned are the propeller shaft 28, the universal joint 32, and the transmission shaft 34 which are sectioned at the ends only;

Figure 4 is a horizontal view, partly of longitudinal central section and partly cut away to expose underlying parts.

Like reference numerals refer to like parts throughout the specification and drawings.

Referring to the drawings, an automobile housing support 20, according to my invention, comprises a longitudinal half-pipe like piece of metal or semi-circular cross-section having a bulged configuration 21 which is of greater cross-section than the ends 22 and 22ᵃ and clamps 23 which are used for securing the housing support 20 to the propeller shaft housing 24, as illustrated in Figure 4. The bulged portion 21 is arc-shaped in longitudinal section and is semi-circular in cross-section in relation to the radius of the support.

Figure 1 illustrates in dotted lines the location of my housing support 20 when assembled to the propeller shaft housing 24 and universal ball housing 25 of an automobile.

Figure 3 illustrates a badly worn housing assembly, the universal ball housing 25 is out of alignment with the propeller shaft housing 24, and the propeller shaft housing 24 is being held up by the propeller shaft 28 which in turn forces the propeller shaft 28 out of coaxial alignment with the universal joint spline yoke 29 and the steady bearing 30. My housing support 20 is mounted on the housings 24 and 25 ready to be secured to the housing 24 by clamps 23, and all sectioning is of longitudinal central section.

Figure 4 illustrates vertical sectioning of a part of the end 22ᵃ of my housing support 20 and vertical section of the propeller shaft housing 24, a longitudinal central section is illustrated of my housing support 20 in assembly with the propeller shaft housing 24 and the universal housing 25. The steady bearing 30 is also centrally sectioned to illustrate the propeller shaft 28 and propeller shaft housings 24 and 25 now being brought into coaxial alignment by my housing support 20 after the clamp nuts 26 have been turned clockwise against the clamp bars 27 which in turn draws my housing support 20 into close assembly with the housings 24 and 25. The end 22 of my housing support is not secured or fastened to the housing 25 but bears downwards on housing 25, thus lifting housing 24 into alignment with housing 25. While no illustration has been made, it is my intention to provide adjustable means by the use of semi-circular shims to be placed between the inner periphery of the end 22ᵃ of my housing support 20 and the propeller shaft housing 24.

My propeller shaft housing support 20 is sturdy in construction; it may be manufactured inexpensively; and is extremely desirable in use.

It will be understood, of course, that modifications may be made in the preferred embodiment of the invention described and illustrated herein without departing from the scope of the invention as defined by the appended claims.

Having thus illustrated and described my invention what I claim as new and desire to protect by Letters Patent of the United States is:

1. Means for supporting and aligning universal housing and propeller shaft housing assemblies comprising a single elongated metal member of semi-circular cross section throughout the greater portion of its length, said elongated member having an enlarged portion adjacent one of its ends, said enlarged portion being semi-circular in cross section and arcuate in longitudinal section in respective relation to the radius and long axis of said member for clearing flanges projecting from the neck of the universal housing, the end of the member remote from the enlarged portion being provided with spaced apart transversely extending grooves, and a substantially U-shaped clamping device lodged in each of said grooves and embracing said propeller shaft housing whereby tightening of the clamping devices urges the member into engagement with the propeller shaft housing and forces that portion of said member beyond the enlarged portion to exert pressure on the neck of the universal housing to move the propeller shaft housing into alignment with the universal housing.

2. Means for supporting and aligning universal housing and propeller shaft housing assemblies comprising a single elongated metal member of semi-circular cross section throughout the greater portion of its length, said elongated member having an enlarged portion adjacent one of its ends, said enlarged portion being semi-circular in cross section and arcuate in longitudinal section in respective relation to the radius and long axis of said member for clearing flanges projecting from the neck of the universal housing, and clamping devices embracing the said member and propeller shaft housing at the end of the member remote from the enlarged portion only so that tightening of the clamping device urges said member into engagement with the propeller shaft housing and forces that portion of the member beyond the enlarged portion to exert pressure on the neck of the universal housing to move said propeller shaft housing into alignment with said universal housing.

FREDRICK ERHARDT.

REFERENCES CITED

The following references are of record in the file of this patent:

UNITED STATES PATENTS

| Number | Name | Date |
| --- | --- | --- |
| 1,733,072 | Pierce | Oct. 22, 1929 |
| 1,940,704 | Sumpter | Dec. 26, 1933 |
| 2,019,562 | Denton | Nov. 5, 1935 |